United States Patent

Conrad et al.

[11] Patent Number: 6,141,826
[45] Date of Patent: Nov. 7, 2000

[54] CENTER AIR FEED FOR CYCLONIC SEPARATOR

[75] Inventors: Wayne Ernest Conrad; Helmut Gerhard Conrad, both of Hampton, Canada

[73] Assignee: G.B.D. Corp., Cayman Islands

[21] Appl. No.: 09/227,534

[22] Filed: Jan. 8, 1999

[51] Int. Cl.[7] ....................................... A47L 9/16
[52] U.S. Cl. ........................ 15/347; 15/353; 55/DIG. 3
[58] Field of Search ................. 15/347, 353; 55/459.1, 55/DIG. 3; 95/271

[56] References Cited

U.S. PATENT DOCUMENTS

| | | | |
|---|---|---|---|
| Re. 32,257 | 10/1986 | Dyson ............................ | 15/335 |
| D. 305,269 | 12/1989 | Dyson ............................ | D32/22 |
| D. 343,707 | 1/1994 | Dyson ............................ | D32/22 |
| D. 382,679 | 8/1997 | Dyson ............................ | D32/21 |
| 450,372 | 4/1891 | Morse ............................ | 55/424 |
| 883,413 | 3/1908 | Mahony ........................... | 15/323 |
| 1,023,082 | 4/1912 | Kluge ............................ | 55/345 |
| 1,127,896 | 2/1915 | Keller ........................... | 55/325 |
| 1,369,939 | 3/1921 | Shaffer .......................... | 110/300 |
| 1,752,231 | 3/1930 | Clarkson ......................... | 55/410 |
| 1,759,947 | 5/1930 | Lee .............................. | 55/439 |
| 1,798,510 | 3/1931 | Winkslow et al. .................. | 55/426 |
| 1,826,798 | 10/1931 | Lee .............................. | 15/351 |
| 1,897,144 | 2/1933 | Prouty .......................... | 209/712 |
| 2,014,287 | 10/1935 | Newman .......................... | 55/429 |
| 2,143,421 | 1/1939 | Loehr et al. .................... | 55/424 |
| 2,171,248 | 9/1939 | Van Berkel ...................... | 55/392 |
| 2,392,872 | 1/1946 | Wolfe ........................... | 55/345 |
| 2,397,872 | 4/1946 | Kovacs .......................... | 227/149 |
| 2,397,980 | 4/1946 | Petri ........................... | 55/426 |
| 2,402,845 | 6/1946 | Rodman .......................... | 55/345 |
| 2,405,625 | 8/1946 | Whiton et al. ................... | 55/323 |
| 2,608,268 | 8/1952 | Gerber .......................... | 55/317 |
| 2,681,124 | 6/1954 | Van er Kolk ..................... | 55/398 |
| 2,822,060 | 2/1958 | Udovich ......................... | 55/459.1 |
| 2,993,223 | 7/1961 | Krammes ......................... | 15/320 |
| 3,200,568 | 8/1965 | McNeil .......................... | 96/195 |
| 3,235,090 | 2/1966 | Bose et al. ..................... | 210/512.1 |
| 3,283,480 | 11/1966 | Szego ........................... | 55/340 |
| 3,320,727 | 5/1967 | Farley et al. ................... | 55/337 |
| 3,425,192 | 2/1969 | Davis ........................... | 55/345 |
| 3,501,014 | 3/1970 | Fitch, Jr. et al. ............... | 210/512.1 |
| 3,535,854 | 10/1970 | Taylor .......................... | 55/338 |
| 3,853,518 | 12/1974 | Tu et al. ....................... | 55/337 |
| 3,877,902 | 4/1975 | Eriksson et al. ................. | 55/337 |
| 3,925,045 | 12/1975 | Cheng ........................... | 55/345 |
| 3,955,236 | 5/1976 | Mekelburg ....................... | 15/314 |
| 4,005,998 | 2/1977 | Gorman .......................... | 95/219 |
| 4,141,698 | 2/1979 | Kihlstedt et al. ................ | 95/69 |
| 4,162,149 | 7/1979 | Mekelburg ....................... | 55/315 |
| 4,172,710 | 10/1979 | Van Der Molen .................. | 15/353 |
| 4,198,290 | 4/1980 | Summers ......................... | 209/710 |

(List continued on next page.)

FOREIGN PATENT DOCUMENTS

| | | |
|---|---|---|
| 54488 | 5/1985 | Canada . |
| 2104136 | 6/1994 | Canada . |
| 69708 | 1/1949 | Denmark . |
| 52195 | 9/1963 | Denmark . |
| 148023 | 3/1961 | U.S.S.R. . |
| 1042812 | 9/1983 | U.S.S.R. . |
| 762070 | 12/1950 | United Kingdom . |
| WO 98/02080 | 1/1998 | WIPO . |
| WO 98/10691 | 3/1998 | WIPO . |
| WO 98/23381 | 6/1998 | WIPO . |
| WO 98/27857 | 7/1998 | WIPO . |
| WO 98/33424 | 8/1998 | WIPO . |

*Primary Examiner*—Theresa T. Snider
*Attorney, Agent, or Firm*—Reed Smith Hazel & Thomas LLP

[57] ABSTRACT

A cyclonic separation device is provided having improved pressure loss characteristics. A fluid supply conduit in flow communication with an inlet to a cyclone is located and configured to extend longitudinally through a central portion of the cyclone, whereby the sharp bending of the conduit may be reduced, thereby reducing pressure losses in the device, without unduly interfering with the cyclonic flow within the cyclone. The present invention may be adapted for use with cyclonic separation devices of all types, including single- and multi-stage cyclonic separators.

24 Claims, 13 Drawing Sheets

U.S. PATENT DOCUMENTS

| | | | |
|---|---|---|---|
| 4,251,241 | 2/1981 | Bothun | 55/DIG. 3 |
| 4,251,368 | 2/1981 | Colman et al. | 210/788 |
| 4,268,288 | 5/1981 | Coombs | 55/537 |
| 4,326,862 | 4/1982 | Suzuki | 96/18 |
| 4,345,572 | 8/1982 | Suzuki et al. | 123/568.11 |
| 4,352,681 | 10/1982 | Dietz | 96/61 |
| 4,373,228 | 2/1983 | Dyson | 15/350 |
| 4,377,882 | 3/1983 | Dyson | 15/335 |
| 4,390,426 | 6/1983 | Vicard | 210/243 |
| 4,398,928 | 8/1983 | Kunsagi | 96/27 |
| 4,443,234 | 4/1984 | Carlsson | 96/57 |
| 4,571,772 | 2/1986 | Dyson | 15/335 |
| 4,573,236 | 3/1986 | Dyson | 15/333 |
| 4,588,423 | 5/1986 | Gillingham et al. | 96/43 |
| 4,593,429 | 6/1986 | Dyson | 15/353 |
| 4,643,748 | 2/1987 | Dyson | 55/338 |
| 4,756,729 | 7/1988 | Brunnmair et al. | 55/391 |
| 4,826,515 | 5/1989 | Dyson | 55/345 |
| 4,853,008 | 8/1989 | Dyson | 55/345 |
| 4,853,011 | 8/1989 | Dyson | 55/345 |
| 5,062,870 | 11/1991 | Dyson | 96/400 |
| 5,078,761 | 1/1992 | Dyson | 96/400 |
| 5,090,976 | 2/1992 | Dyson | 55/337 |
| 5,101,532 | 4/1992 | Dyson et al. | 15/320 |
| 5,145,499 | 9/1992 | Dyson | 55/337 |
| 5,160,356 | 11/1992 | Dyson | 55/345 |
| 5,254,147 | 10/1993 | Finke | 15/353 |
| 5,267,371 | 12/1993 | Soler et al. | 15/327.5 |
| 5,307,538 | 5/1994 | Rench et al. | 15/347 |
| 5,350,432 | 9/1994 | Lee | 55/408 |
| 5,558,697 | 9/1996 | Dyson et al. | 95/12 |
| 5,591,253 | 1/1997 | Altman et al. | 96/61 |
| 5,755,007 | 5/1998 | Dyson | 15/327.5 |
| 5,779,745 | 7/1998 | Kilstrom | 15/353 |
| 5,935,279 | 8/1999 | Kilstrom | 15/353 |
| 5,950,274 | 9/1999 | Kilstrom | 15/350 |
| 4,390,426 | 6/1983 | Vicard | 210/243 |
| 4,398,928 | 8/1983 | Kunsagi | 96/27 |
| 4,443,234 | 4/1984 | Carlsson | 96/57 |
| 4,571,772 | 2/1986 | Dyson | 15/335 |
| 4,573,236 | 3/1986 | Dyson | 15/333 |
| 4,588,423 | 5/1986 | Gillingham et al. | 96/43 |
| 4,593,429 | 6/1986 | Dyson | 15/353 |
| 4,643,748 | 2/1987 | Dyson | 55/338 |
| 4,756,729 | 7/1988 | Brunnmair et al. | 55/391 |
| 4,826,515 | 5/1989 | Dyson | 55/345 |
| 4,853,008 | 8/1989 | Dyson | 55/345 |
| 4,853,011 | 8/1989 | Dyson | 55/345 |
| 5,062,870 | 11/1991 | Dyson | 96/400 |
| 5,078,761 | 1/1992 | Dyson | 96/400 |
| 5,090,976 | 2/1992 | Dyson | 55/337 |
| 5,101,532 | 4/1992 | Dyson et al. | 15/320 |
| 5,145,499 | 9/1992 | Dyson | 55/337 |
| 5,160,356 | 11/1992 | Dyson | 55/345 |
| 5,254,147 | 10/1993 | Finke | 15/353 |
| 5,267,371 | 12/1993 | Soler et al. | 15/327.5 |
| 5,307,538 | 5/1994 | Rench et al. | 15/347 |
| 5,350,432 | 9/1994 | Lee | 55/408 |
| 5,558,697 | 9/1996 | Dyson et al. | 95/12 |
| 5,591,253 | 1/1997 | Altman et al. | 96/61 |
| 5,755,007 | 5/1998 | Dyson | 15/327.5 |
| 5,779,745 | 7/1998 | Kilstrom | 15/353 |
| 5,935,279 | 8/1999 | Kilstrom | 15/353 |
| 5,950,274 | 9/1999 | Kilstrom | 15/350 |

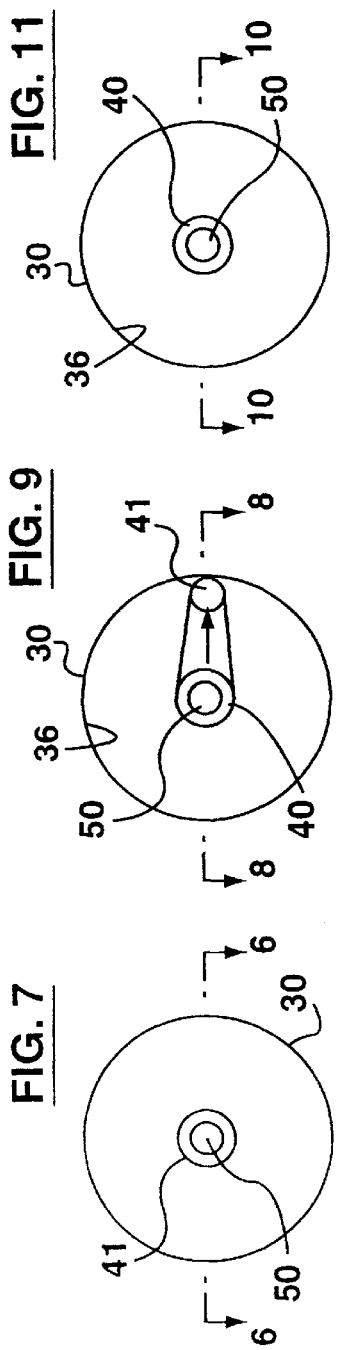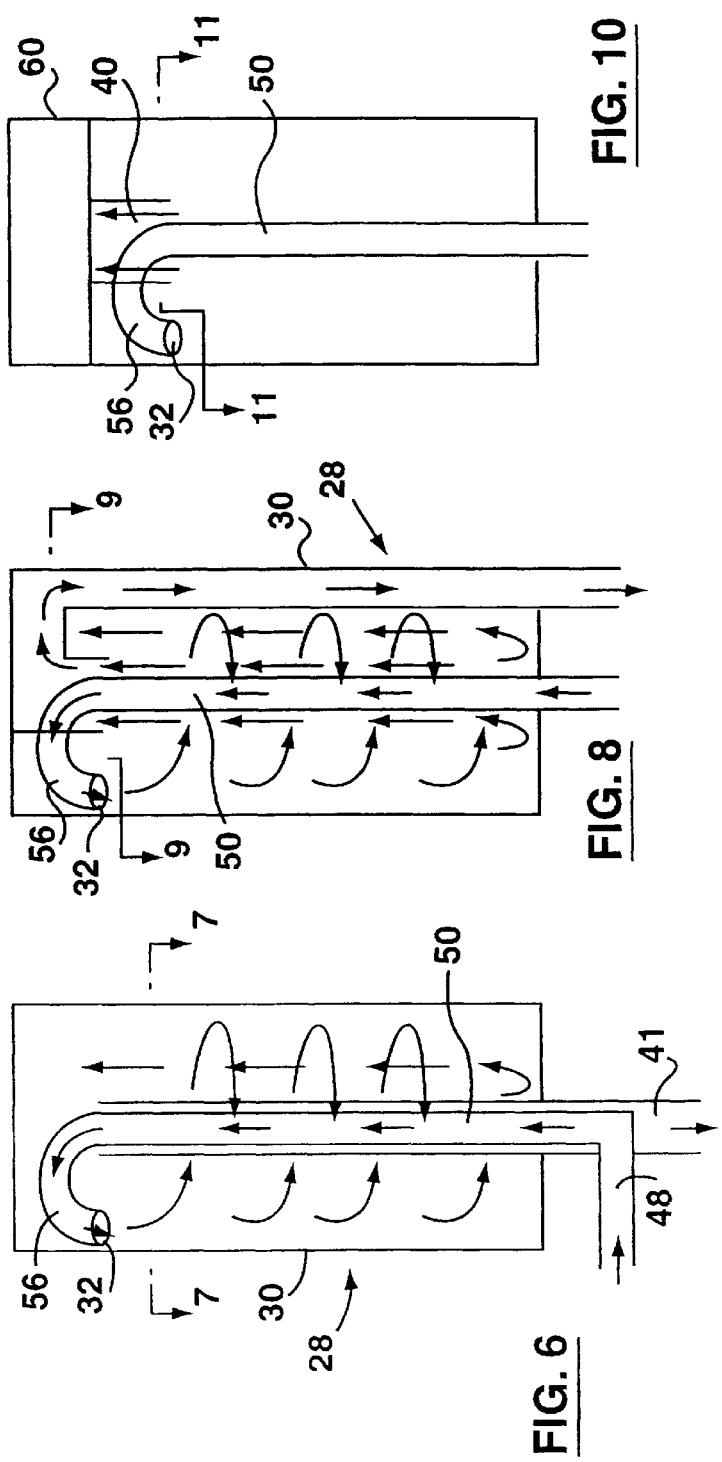

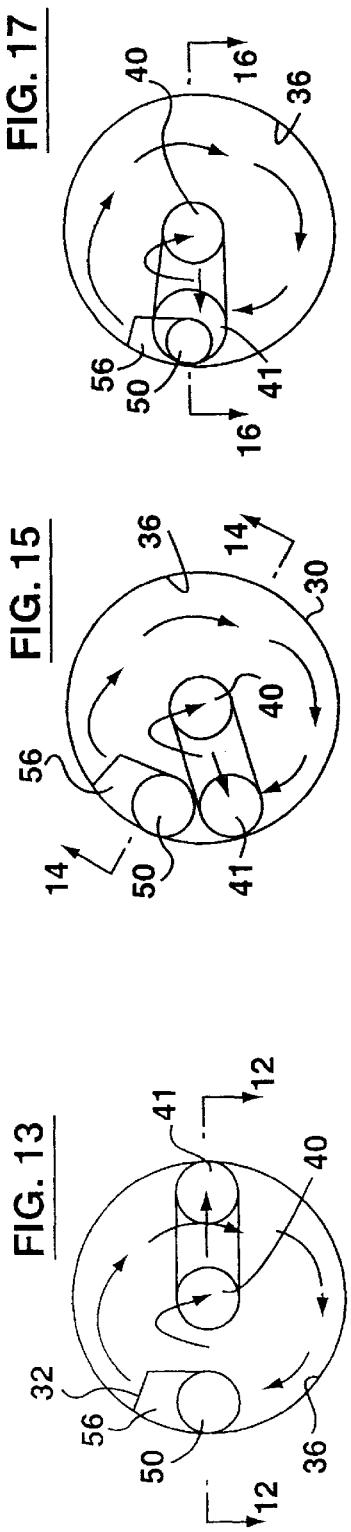

CENTER AIR FEED FOR CYCLONIC SEPARATOR

FIELD OF THE INVENTION

The present invention relates generally to cyclonic separators. In one particular application, the invention relates to the cyclonic separation of dirt from an air flow such as in a vacuum cleaner.

BACKGROUND OF THE INVENTION

The use of a cyclone, or multiple cyclones connected in parallel or series, has long been known to be advantageous in the separation of particulate matter from a fluid stream. Typically, a relatively high speed fluid stream is introduced tangentially to a generally cylindrical or frusto-conical container, wherein the dirty air stream is accelerated around the inner periphery of the container. The centrifugal acceleration caused by the travel of the fluid in a cyclonic stream through the cyclone causes the particulate matter to be entrained from the fluid flow and, eg., to collect at the bottom of the container. A fluid outlet is provided for the extraction of the fluid from the centre of the top of the cyclone container, as is well known in the art.

A typical flow path in a cyclone separator is as follows. Fluid to be treated is introduced tangentially at a fluid inlet located at an upper end of the cyclone container. The fluid stream rotates around the inner surface of the cyclone container, and spirals generally downwardly around the inner surface (if the cyclone container is vertically disposed). At a bottom end of the cyclone container the fluid stream travels radially inwardly, generally along the bottom of the container and then turns upwardly and proceeds vertically up and out of the cyclone container. The particulate matter separating action of the cyclonic flow occurs substantially around the inner surface. Once the air moves inwardly to the centre of the container, and upwardly therethrough, there is little or no dirt separation achieved.

The advantages of cyclonic separation have been combined with an upright vacuum cleaner to provide a household cyclonic vacuum cleaner, as shown in U.S. Pat. No. 4,593,429 to Dyson. As shown in FIG. 1, this vacuum cleaner 10 essentially comprises a large, outer cylindrical cyclone 12, with an inner cyclone 14 nested therein, which is mounted on a floor-cleaning head and provided with a push handle for convenient movement of the unit. A motor, located in the floor cleaning head, draws air through the cleaning head and into an intake conduit 16, which delivers air to the dirty air inlet 18 of the outer cyclone container 12. From the outer cyclone the air flows into inner, nested dust separating cyclone 14, and from there, continues on through the vacuum motor to a clean air exhaust port.

The air intake conduit 16 connects the floor cleaning head and the dirty air inlet in air flow communication. Air intake conduit 16 extends upwardly along the outside of outer cyclone container 12 generally parallel to the longitudinal axis of the cyclones 12, 14. At a position adjacent air inlet 18 to outer cyclone 12, air intake conduit 16 bends 90° and travels inwardly to provide a tangential air flow inlet to air inlet 18 of outer cyclone container 12.

In use, air intake conduit 16 may become blocked. If the blockage occurs at a midpoint of the conduit, it may be difficult to clear the blockage. While a clean out port may be provided, the port may not be located near where the blockage occurs. Further, the addition of a port increases the cost and complexity of the manufacture of the product.

A bend in a conduit for a fluid causes a turbulent pressure loss in the conduit as the fluid travels through the bend in the conduit and the greater the sharpness of the bend, the greater the pressure loss. The pressure loss in the air flow decreases the amount of suction which can be generated at the cleaning head of the vacuum cleaner for any given motor in the vacuum cleaner and therefore the efficiency of the vacuum cleaner.

SUMMARY OF THE INVENTION

In accordance with the instant invention, there is provided a method comprising vacuum cleaner comprising:

(a) a cleaning head for cleaning a surface;

(b) at least one cyclone removable from the vacuum cleaner, a wall having an inner surface and a longitudinally extending axis;

(c) a fluid inlet to the at least one cyclone; and, (d) a fluid supply conduit communicating with the cleaning head and with the fluid inlet, a portion of the fluid supply conduit removable with the cyclone from the vacuum cleaner.

One advantage of the instant invention is that, with the removal of the cyclone, access may be provided to various portions of the supply conduit, without the use of access ports, so as to facilitate the clean out of any blockage that may develop in the supply conduit.

In accordance with the instant invention, there is also provided a vacuum cleaner comprising:

(a) a cleaning head for cleaning a surface;

(b) at least one cyclone having a wall having an inner surface and a longitudinally extending axis;

(c) a fluid inlet to the at least one cyclone; and, (d) a fluid supply conduit communicating with the cleaning head and with the fluid inlet, the fluid supply conduit extending longitudinally through the cyclone.

Another advantage of the instant invention is that by positioning the fluid feed conduit so as to pass through the cyclone, the construction of the vacuum cleaner may be simplified. Since the fluid supply conduit extends to the entrance end of the cyclone within the cyclone, the housing in which the cyclone is mounted need not be constructed so as to contain the supply conduit. This simplifies the manufacture of the housing since it is not necessary to provide a hollow passage internal of the housing for the air supply conduit.

In one embodiment, the fluid supply conduit extends longitudinally through the cyclone.

In another embodiment, the cyclone has a central portion and the fluid supply conduit extends through the central portion. The fluid supply conduit may extend coaxially with the axis of the cyclone. Alternately, or in addition, the fluid supply conduit may comprise an exit portion which extends within the cyclone from the central portion outwardly towards the inner surface.

In another embodiment, the fluid supply conduit comprises an exit portion which is configured to direct the fluid tangentially into the cyclone. For example, the exit portion may be configured so as to extend in an arc around a portion of the longitudinal axis of the cyclone. Thus, as the fluid travels to the inlet, circuit acceleration may be applied to the fluid thus assisting, or even creating, the cyclonic fluid flow in the cyclone.

In another embodiment, the fluid supply conduit comprises an exit portion which is curved to at least assist in directing the fluid tangentially into the cyclone through the fluid inlet.

In another embodiment, the exit portion includes a curved portion. By having a curve, a 90° elbow at the transition from the exit portion to the inlet may be avoided thus avoiding a substantial pressure drop in the supply conduit.

In another embodiment, the exit portion extends substantially horizontally.

In another embodiment, the fluid supply conduit comprises a longitudinally extending portion and an exit portion which extends within the cyclone from the central portion outwardly towards the inner surface, the longitudinally extending portion having a curved portion which merges with the exit portion. The exit portion may be curved to at least assist in directing the fluid tangentially into the cyclone through the fluid inlet.

In another embodiment, the cyclone has an outlet having a portion which is removable with the cyclone and one of the portion of the outlet and the portion of the fluid supply conduit is nested within the other.

In another embodiment, the portion of the fluid supply conduit is integrally formed as part of the cyclone.

In another embodiment, the fluid supply conduit has an upstream portion positioned exterior to the cyclone and a downstream portion which extends from the upstream portion longitudinally through the cyclone and the downstream portion is in air flow communication with the upstream portion when the cyclone is mounted in the housing and the downstream portion is removable with the cyclone from the housing.

In accordance with the instant invention, there is also provided a method comprising:

(a) providing a fluid having a first element and a second element;

(b) conveying the fluid in a conduit longitudinally through a cyclone having a longitudinal axis and an inner longitudinally extending surface;

(c) passing the fluid through the cyclone to remove at least a portion of the first element from the fluid and obtain at least one treated system having a reduced concentration of the first element.

In one embodiment, step (b) further comprises conveying the fluid centrally through the cyclone.

In another embodiment, the cyclone may have a central portion through which the fluid passes and the method further comprises subsequent to conveying the fluid longitudinally through the cyclone, conveying the fluid outwardly from the central portion to tangentially enter the cyclone.

In another embodiment, the method further comprises conveying the fluid around at least a portion of the longitudinal axis of the cyclone as the fluid passes outwardly from the central portion.

In another embodiment, the method further comprises providing centrifugal acceleration to the fluid as it passes outwardly from the central portion.

In another embodiment, the method further comprises, subsequent to conveying the fluid in a conduit longitudinally through the cyclone, gradually changing the direction of the fluid to travel outwardly to the inner surface of the cyclone.

BRIEF DESCRIPTION OF THE DRAWINGS

For a better understanding of the present invention, and to show more clearly how it may be carried into effect, reference will now be made by way of example to the accompanying drawing which show a preferred embodiment of the present invention, in which:

FIG. 1a is a perspective view of a vacuum cleaner according to the present invention;

FIG. 1b is an enlargement of the lower portion of the housing of the present invention with the container removed from the housing;

FIG. 6 is a cross-section along line 6—6 in FIG. 7 of a further alternate preferred embodiment of the instant invention;

FIG. 7 is a cross-section along line 7—7 in FIG. 6;

FIG. 8 is a cross-section along line 8—8 in FIG. 9 of a further alternate preferred embodiment of the instant invention;

FIG. 9 is a cross-section along the line 9—9 in FIG. 8;

FIG. 10 is a cross-section along line 10—10 in FIG. 11 of a further alternate preferred embodiment of the instant invention;

FIG. 11 is a cross-section along the line 11—11 in FIG. 10;

FIG. 12 is a cross-section along line 12—12 in FIG. 13 of a further alternate preferred embodiment of the instant invention;

FIG. 13 is a cross-section along the line 13—13 in FIG. 12;

FIG. 14 is a cross-section along line 14—14 in FIG. 15 of a further alternate preferred embodiment of the instant invention;

FIG. 15 is a cross-section along the line 15—15 in FIG. 14;

FIG. 16 is a cross-section along line 16—16 in FIG. 17 of a further alternate preferred embodiment of the instant invention;

FIG. 17 is a cross-section along the line 17—17 in FIG. 16;

DETAILED DESCRIPTION OF THE PREFERRED EMBODIMENT

The preferred embodiment of the instant invention is described in its use with a vacuum cleaner and in particular an upright vacuum cleaner. It will be appreciated that the improvements to cyclonic separators described herein may be used with canister vacuum cleaners as well as cyclonic separation devices of any sort, including industrial dust collection systems and liquid/liquid, liquid/gas and gas/gas separation systems. For example, they may be used with single or multiple stage of filtration assemblies, and may even be utilized where nested serial cyclones are employed.

Figure 1:
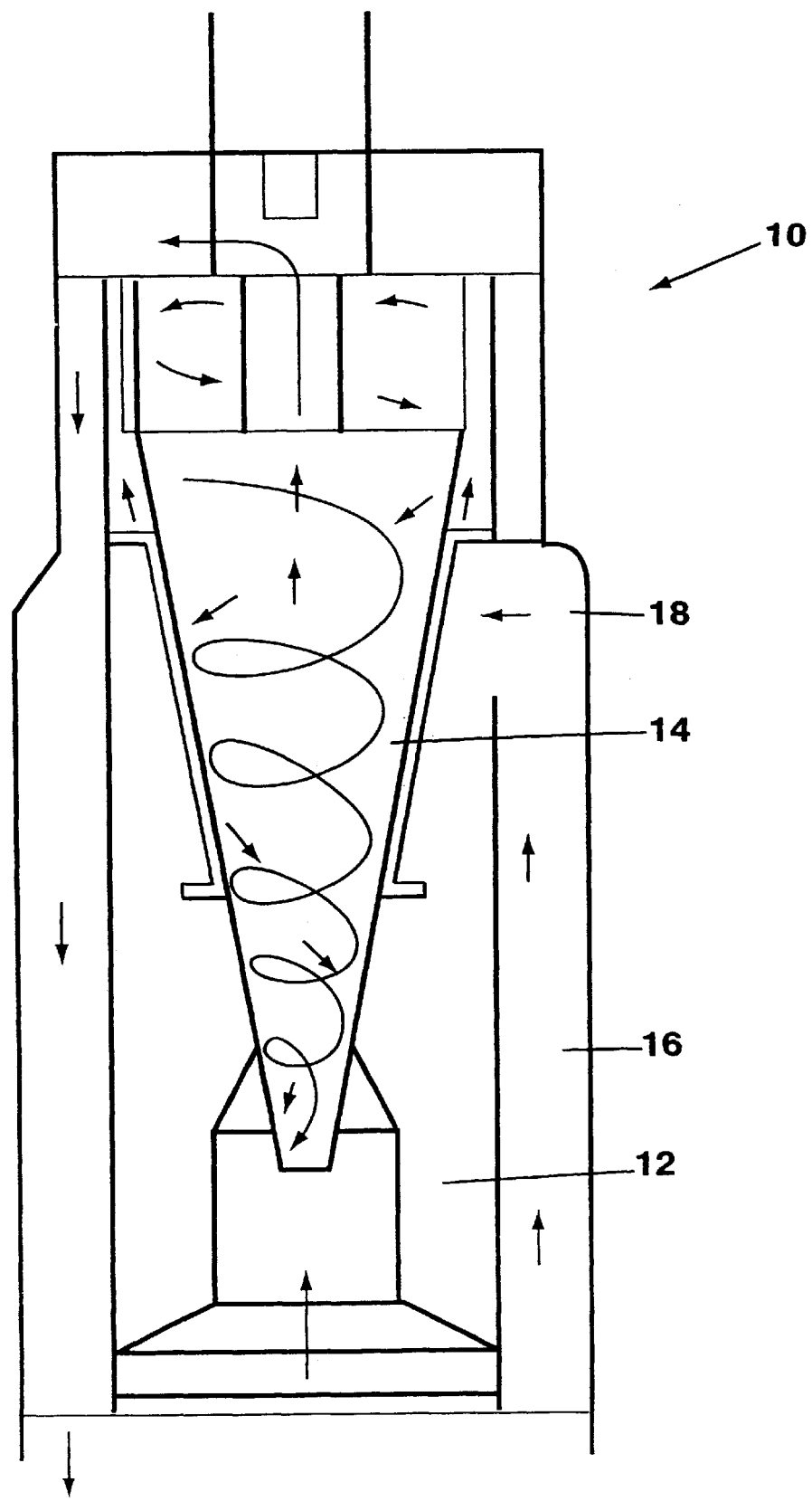
FIG. 1 is a cross-sectional side elevation of an upright cyclonic vacuum cleaner with an air intake conduit according to the prior art.
Figure 2:
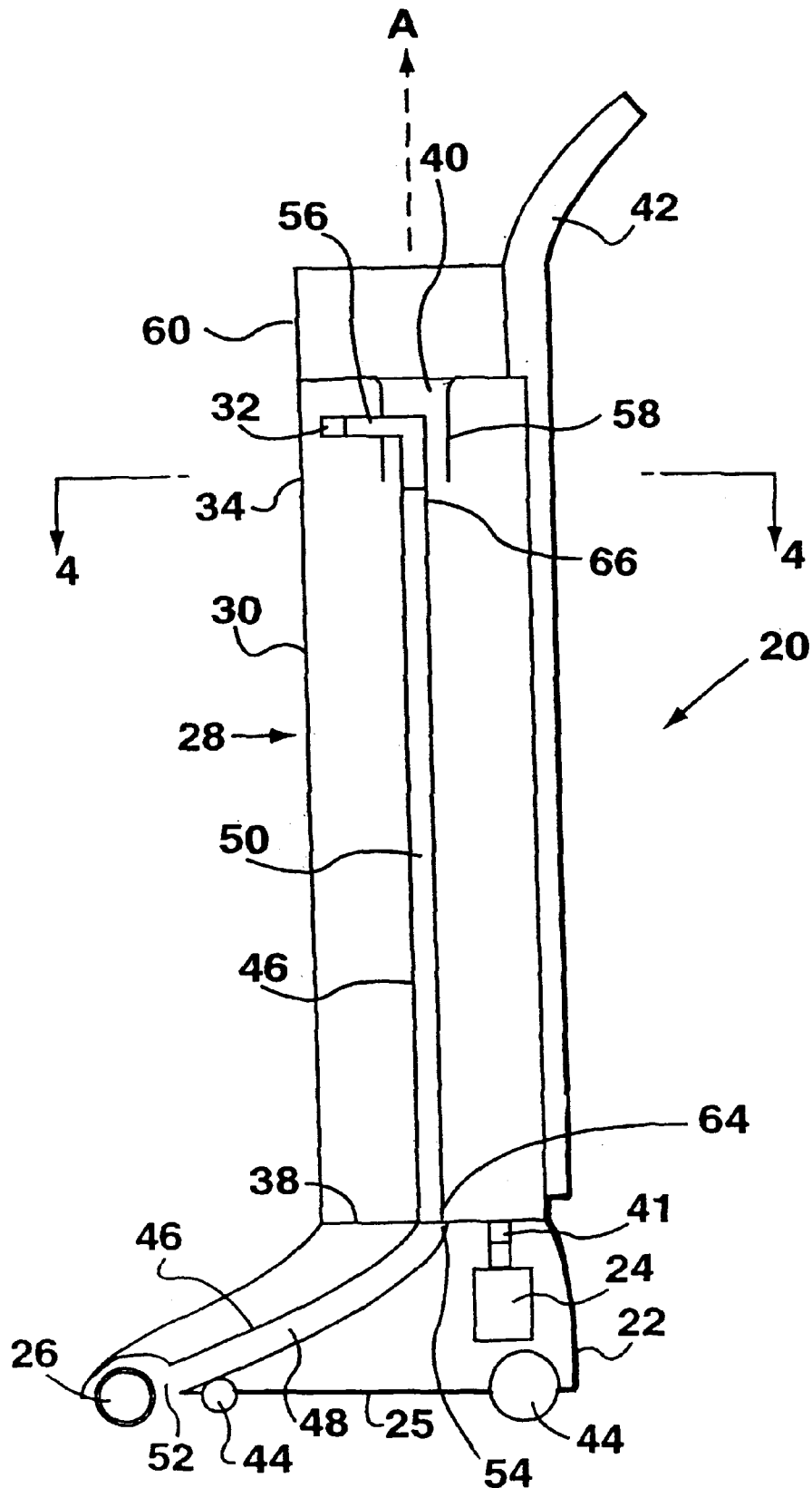
FIG. 2 is a cross-section along line 2—2 in FIG. 4 of an upright cyclonic vacuum cleaner with an air intake conduit according to the present invention.
Figure 3:
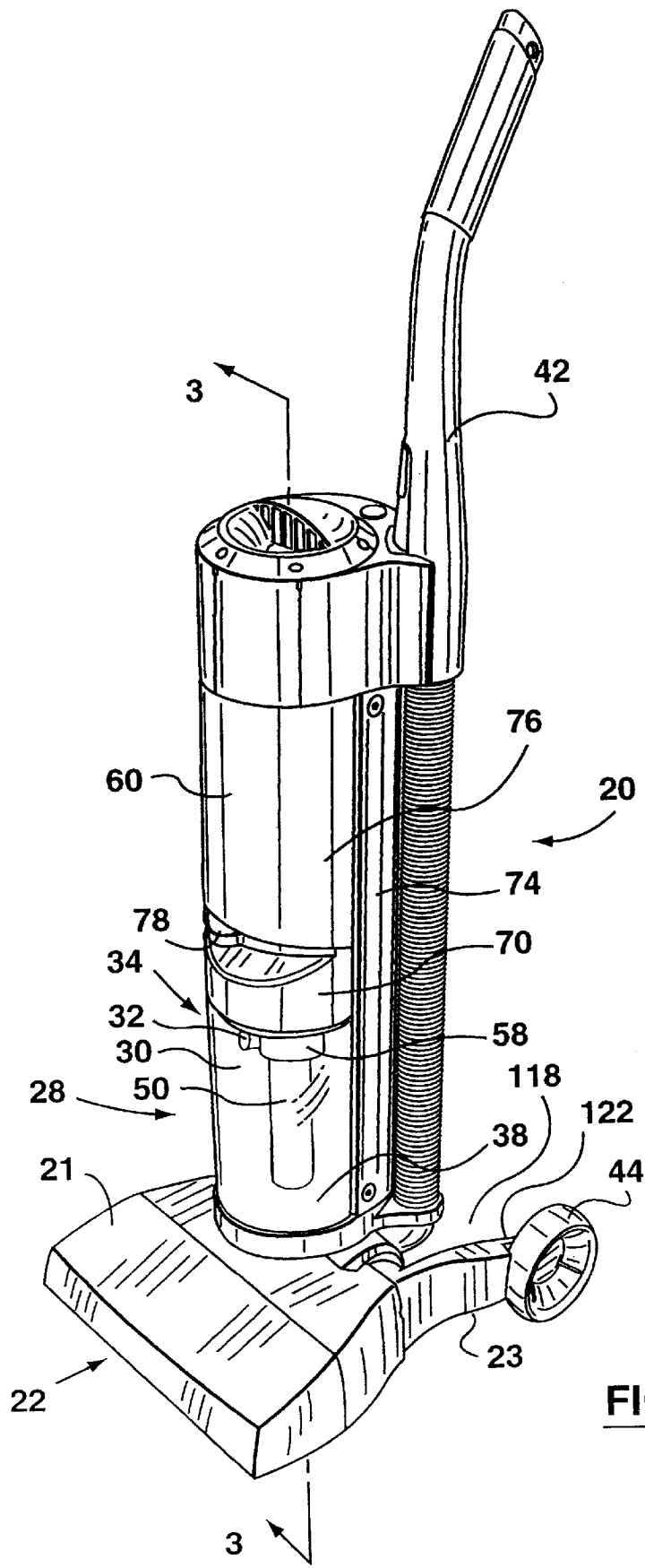
FIG. 3 is a cross-section along line 2—2 in FIG. 4 of an alternate preferred embodiment of an upright cyclonic vacuum cleaner with an air intake conduit according to the present invention.
Figure 3A:
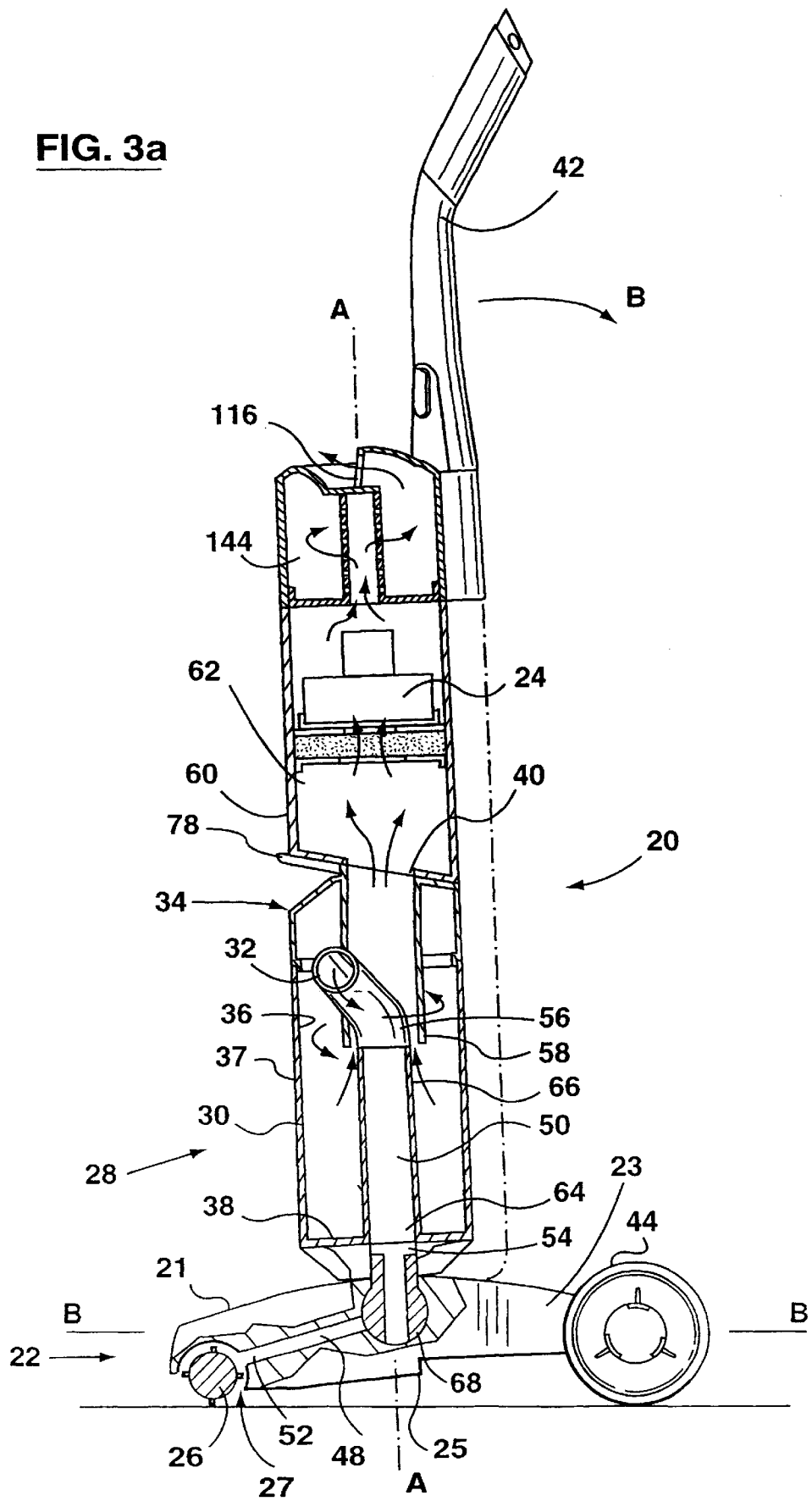

An upright cyclonic vacuum 20 according to the present invention is shown in the FIGS. 2 and 3. A floor cleaning head 22 is provided at the lower end of cleaner 20. Head 22 comprises a vacuum fan motor 24 and a transversely extending, floor-contacting rotating brush member 26 which is connected for rotation to a shaft (not shown). Motor 24 provides motive force to rotate brush 26 by means of, for example, a belt (not shown). Mounted on the cleaning head is cyclonic dust separation unit, indicated generally at 28. Cyclonic unit 28 may comprise any type of dirt separation cyclone known in the art, e.g. cylindrical or frusto-conical, and may comprise a single stage cyclone or multiple stage cyclone (either in series and/or parallel). Cyclonic unit 28 comprises at least a first cyclone container 30 having an air inlet 32, typically at an upper end 34 thereof, adapted for providing an air flow tangentially to an inner dirt rotation surface 36 of container 30. Container 30 also has a dirt collection surface or bottom 38 and an clean air outlet 40. Clean air outlet 40 is in air communication with motor 24 via air exit conduit 41. Upper end 34 of container 30 is sealed, such as by an upper panel 35.

Figure 4:
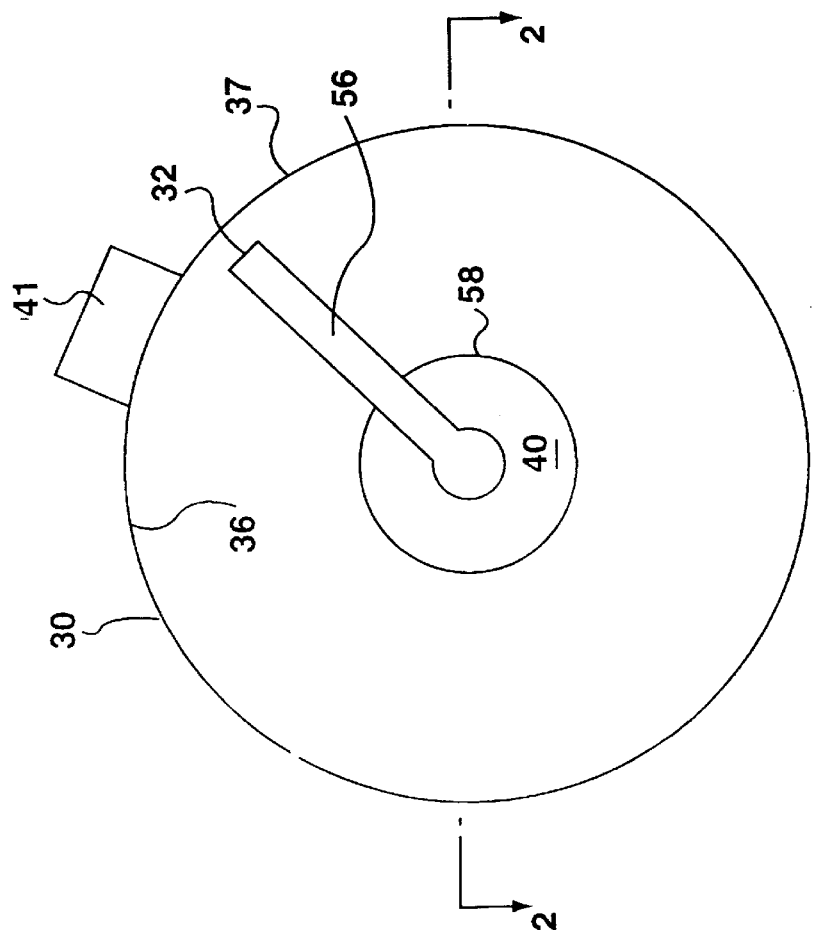
FIG. 4 is a cross-section along line 4—4 in FIG. 2.
Figure 21:
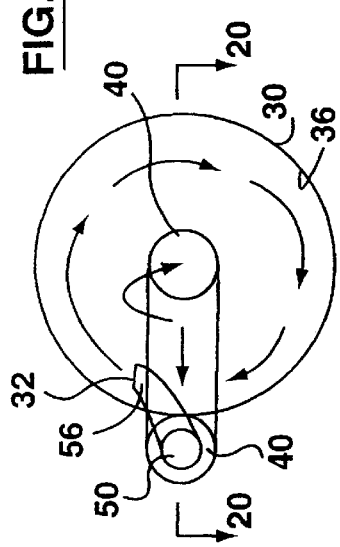
Figure 20:
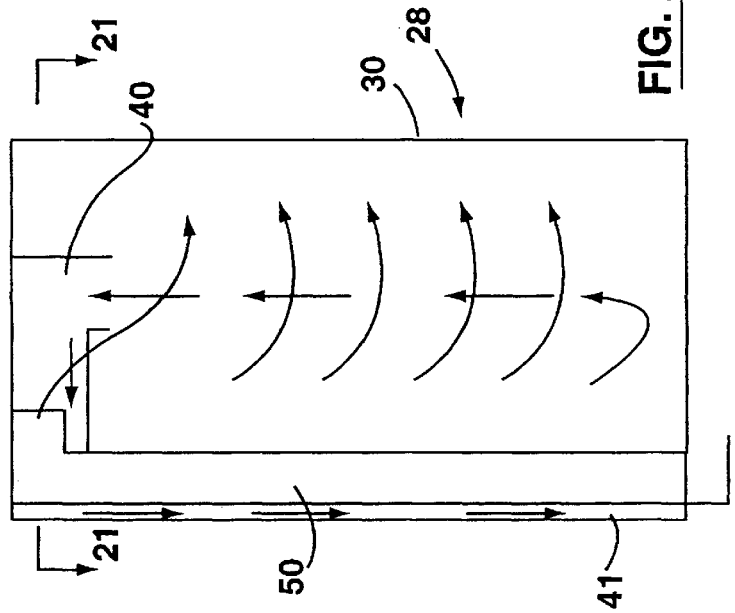
FIG. 20 is a cross-section along line 20—20 in FIG. 21 of a further alternate preferred embodiment of the instant invention; and, FIG. 21 is a cross-section along the line 21—21 in FIG. 20.
Figure 19:
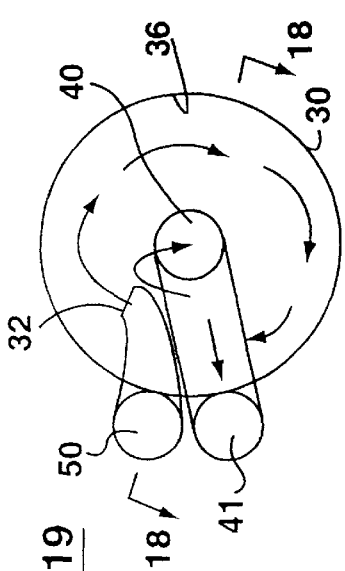
FIG. 19 is a cross-section along the line 19—19 in FIG. 18.
Figure 18:
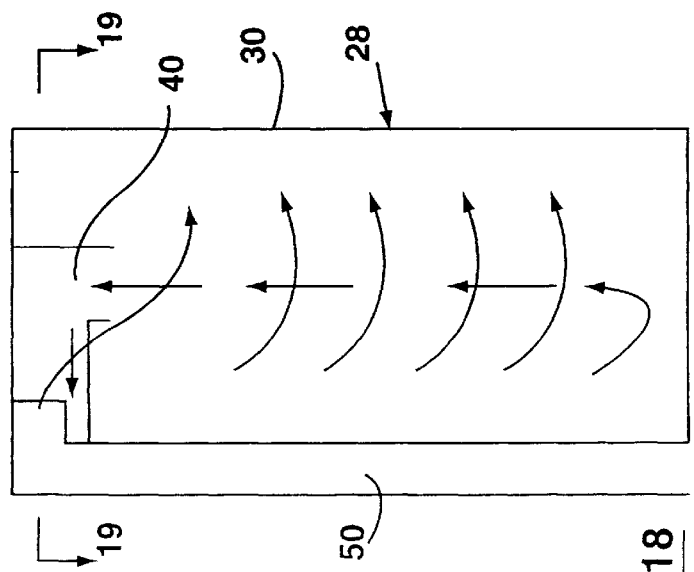
FIG. 18 is a cross-section along line 18—18 in FIG. 19 of a further alternate preferred embodiment of the instant invention.
Figure 22:
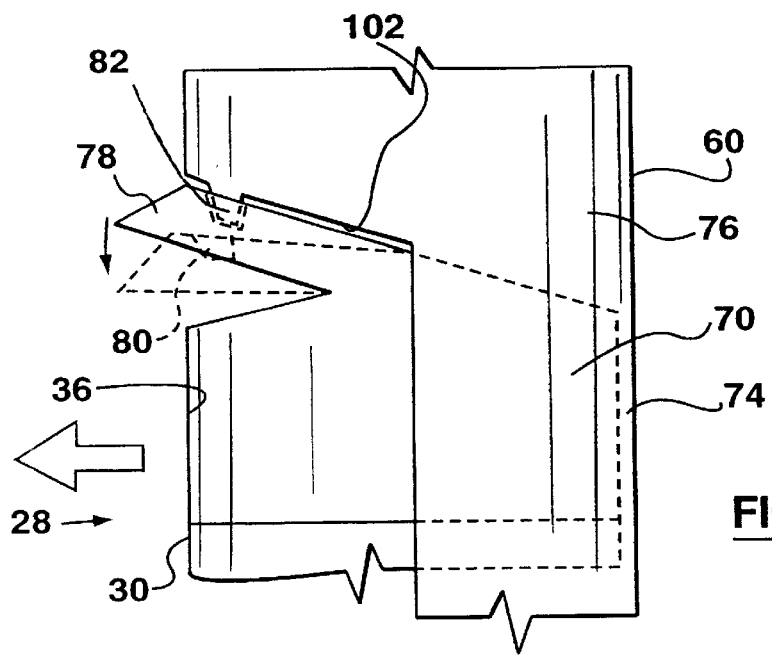
Figure 23:
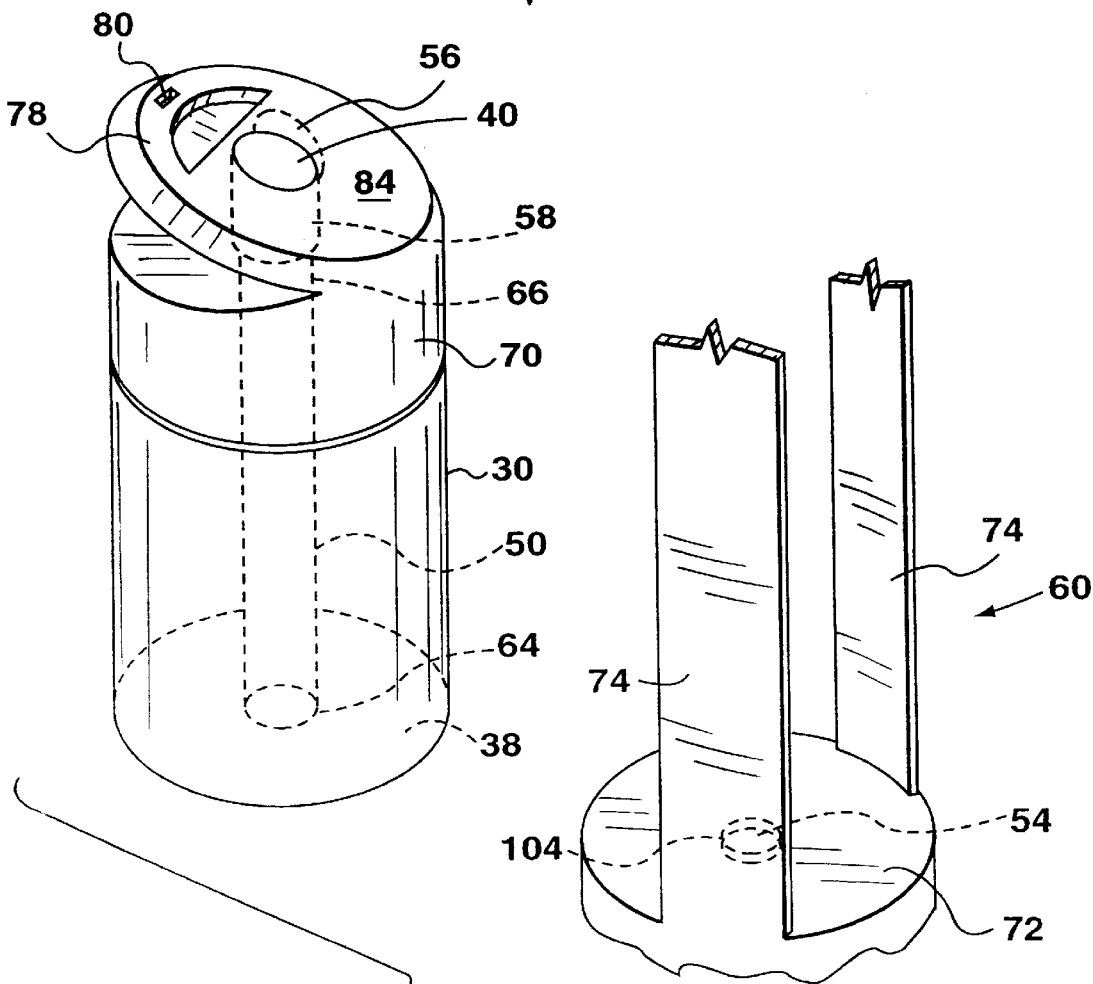
Figures 24, 25:
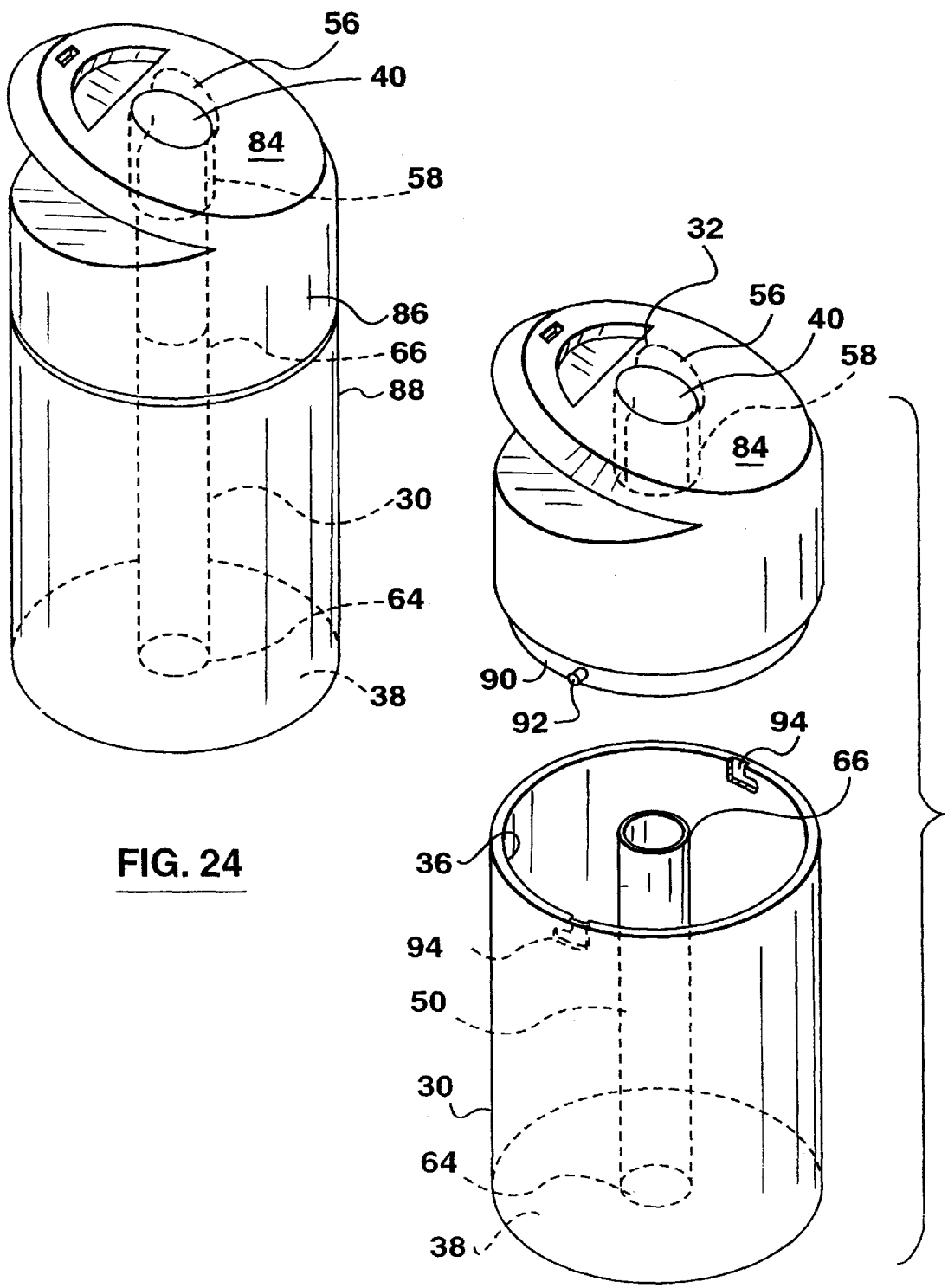
Figure 26:
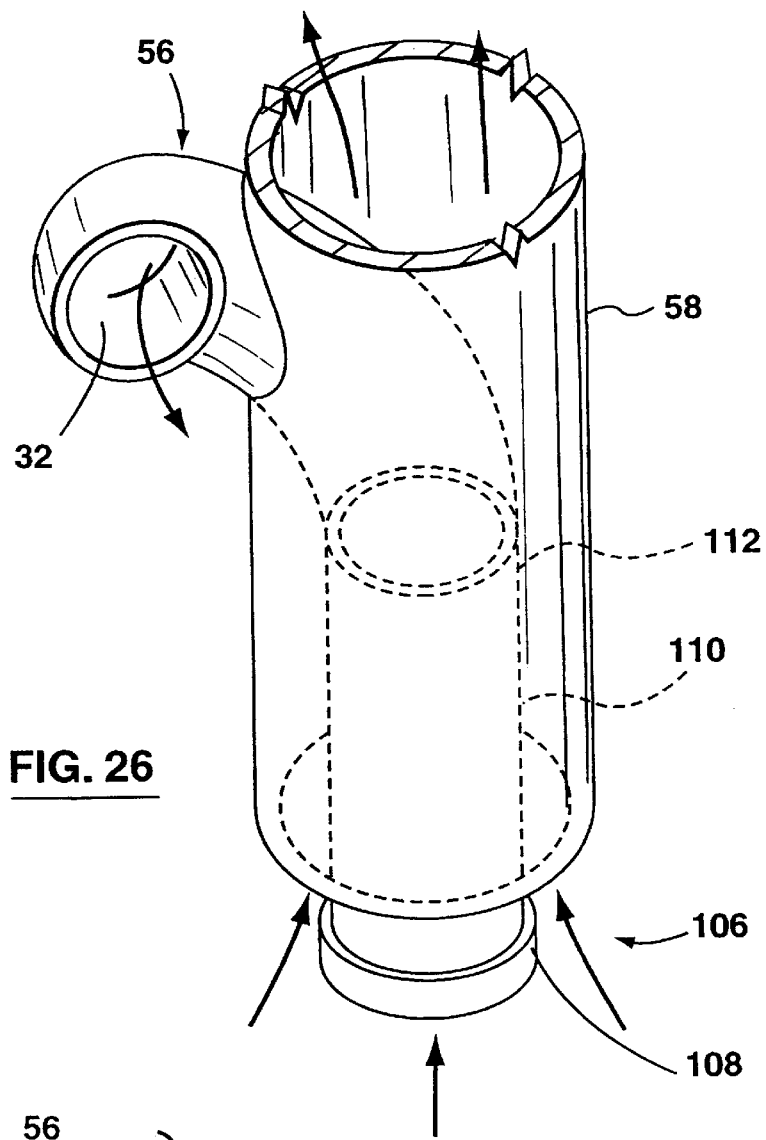
Figure 27:
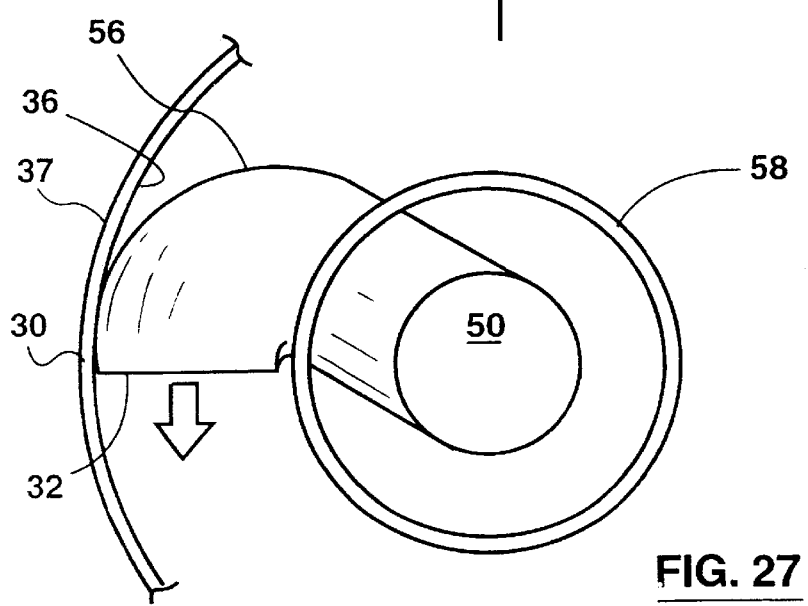
Figure 28:
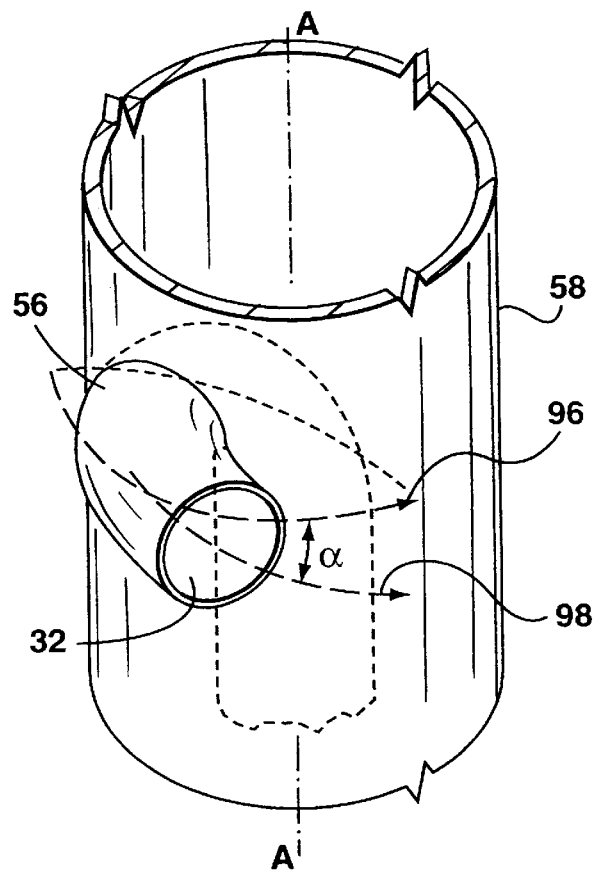
Figure 29:
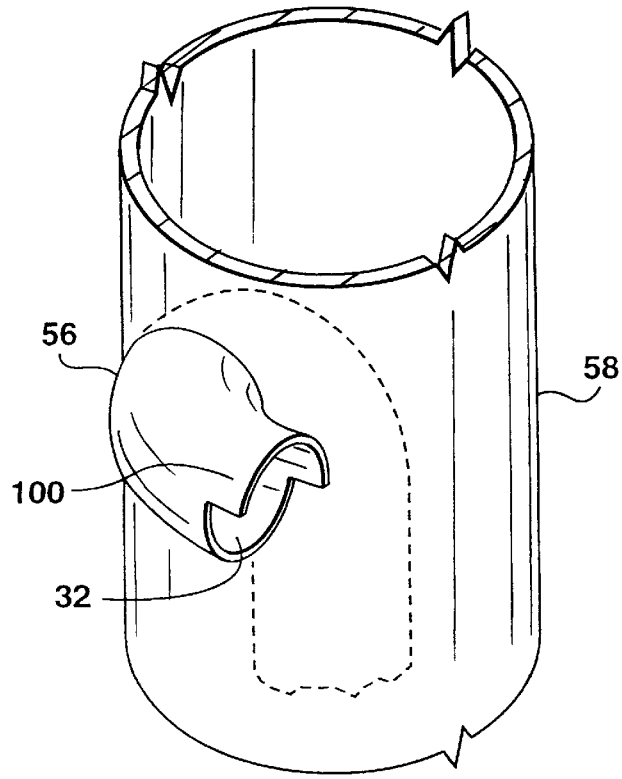
Figure 30:
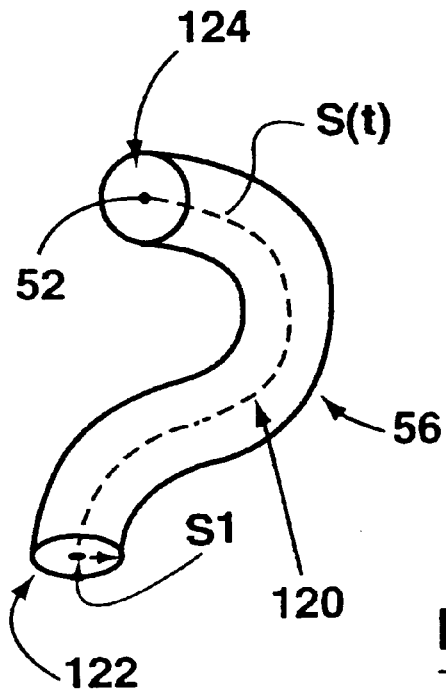
Figure 30A:
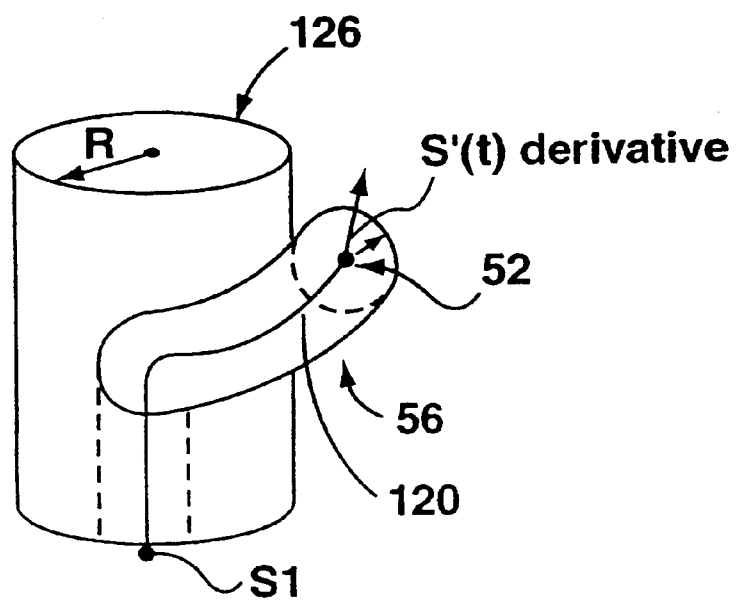

Conduit 41 may be positioned exterior to the housing on which container 30 is mounted as shown in FIGS. 4, 18 and 20. Alternatively, it may be positioned within the housing (either centrally as shown in FIG. 6, or adjacent surface 36 as shown in FIGS. 8, 12, 14 and 16). Further, the treated air may optionally exit the vacuum cleaner at any desired location if it is not required to cool the motor (see for example FIG. 10). It will be appreciated that if conduit 41 extends to a position adjacent motor 24, then it is preferably constructed from two portions in a similar fashion to supply conduit 46 such that the upstream portion of conduit 41 is removable with container 30 from the vacuum cleaner and is in air flow communication with the downstream portion of conduit 41 (see for example FIG. 6) when container 30 is reinserted into the vacuum cleaner such that the upstream and downstream portions of conduit 41 provide air flow communication for the clean air to travel past the motor to provide cooling therefor. A handle 42 and wheels 44 may be provided on cleaner 20 to facilitate movement of the unit for cleaning of a floor, and the like.

The air flow path through cleaner 20 commences with an air supply conduit 46 having an upstream portion 48 and a downstream portion 50. Upstream portion 48 is provided in head 22 and has a first end 52 positioned adjacent brush member 26 for receiving the dirt laden air and a distal second end 54. Downstream portion 50 is positioned in air flow communication with second end 54. Preferably upstream and downstream portions 48, 50 are substantially sealed together to prevent air and dirt leaking therefrom.

In one embodiment, upstream and downstream portions 48, 50 may comprise a single member (whether integrally formed or connected together). In such a case, portions 48, 50 are flexible so as to allow cyclone container 30 to be emptied. Preferably, they are separate elements which are in air flow communication when container is mounted in vacuum cleaner 20. Thus, if a blockage develops in conduit 46, by removing container 30 from vacuum cleaner 20, portions 48 and 50 may be individually accessed at end 54 to clean out the blockage.

As shown in FIGS. 2, 3, 6, 8, 10, 12, 14 and 16 downstream portion 50 may extend upwardly through container 30. Alternatively, as shown in FIGS. 18 and 20, downstream portion 50 may extend upwardly at a position adjacent the outer surface of container 30. Whether downstream portion 50 is provided internally or externally to container 30, by manufacturing the vacuum cleaner so that downstream portion 50 is removable with container 30 from the vacuum cleaner, access is provided to both the upstream and downstream portions of downstream portion 50 as well as end 54 of upstream portion 48. Accordingly, multiple access ports are effectively provided as part of the construction of the vacuum cleaner. It will be appreciated that downstream portion 50 may be manufactured as part of container 30 (such as by moulding it integrally therewith). Alternately, it may be separately manufactured (such as by extrusion) and subsequently affixed to container 30 by any means known in the art.

Downstream portion 50 may enter container 30 at any point (eg. via a side wall) but preferably enters through bottom 38. Further, downstream portion 50 preferably extends generally upwardly through the central portion of container 30 which comprises the area occupied by the vertical return path of the fluid as it travels from bottom 38 to outlet 40. As shown in FIGS. 2 and 3, downstream portion 50 preferably extends coaxially with the longitudinal axis A of container 30, however, it may be positioned off centre either internal of container 30 (see for example FIG. 12) or external of container 30 (see for example FIGS. 18 and 20).

Downstream portion 50 is preferably positioned at any location within container 30 where it does not unduly interfere with the cyclonic flow of air within container 30. For this reason, if downstream portion 50 is positioned within container 30, it preferably is centrally located in container 30. In particular, in a cyclone, the air travels generally in an annular band adjacent surface 36 of container 30. The air travels generally downwardly until it reaches a position towards bottom 38 of container 30 at which point the air travels upwardly through the central portion of cyclone container 30. In a most preferred embodiment of this invention, downstream portion 50 is positioned within this central portion of container 30 which contains this upflow of air.

As shown in FIGS. 12, 14 and 16, downstream portion 50 may be positioned adjacent sidewall 36. In such cases, downstream portion 50 is preferably constructed so as to minimize its interference with the flow of air around surface 36. For example, downstream portion 50 may be constructed with rounded surfaces so as to direct the flow of air around downstream portion 50. Further, downstream portion 50 need not be circular in shape but may be elliptical or of other constructions wherein it has a radial extent (i.e. around inner surface 36) which is substantially greater than its width in a direction transverse thereto (i.e. radially inwardly). Thus, downstream portion 50 would extend only slightly into container 30 and would not substantially interfere with the cyclonic flow of air in container 30. If conduit 41 is positioned adjacent inner surface 36, it is also preferably so shaped. It will be appreciated that downstream portion 50 and conduit 41 may be positioned on opposed portions of inner surface 36 (see FIG. 12) or at any other location, such as adjacent each other (see FIG. 14).

In another embodiment, downstream portion 50 and outlet 40 may be nested one within the other. For example, as shown in FIGS. 6 and 7, downstream portion 50 may be positioned within, and preferably co-axially within, conduit 41. Alternately, conduit 41 may be positioned within, and preferably co-axially within, downstream portion 50. As shown in FIG. 16, conduits 41 and 50 may be provided in a nested relationship adjacent surface 36. It will also be appreciated that conduits 41 and 50 may be positioned adjacent each other, for example, adjacent inner surface 36 as shown in FIG. 14, or within the central portion of container 30 (not shown). Further, they may be nested within each other or positioned adjacent each other when located adjacent the exterior of container 30 as shown in FIGS. 18 and 20.

Exit portion 56 is positioned at the upper end of downstream portion 50. Inlet 32 is positioned at the distal end of exit portion 56 from downstream portion 50. Exit portion 56 may extend along any desired path from downstream portion 50 to inlet 32. Preferably, exit portion 56 is wholly positioned within container 30 (eg. it does not exit the container 30 through upper end 34).

Exit portion 56 may extend at a right angle to downstream portion 50 as shown in FIG. 2. Further, it may extend in a straight line to inlet 32 as shown in FIG. 4. It will be appreciated that inlet 32 may be any inlet known in the cyclonic art to introduce air tangentially into a cyclone and it may be positioned at any point along the longitudinal length of container 30 as is known in the cyclonic art.

Figure 5:
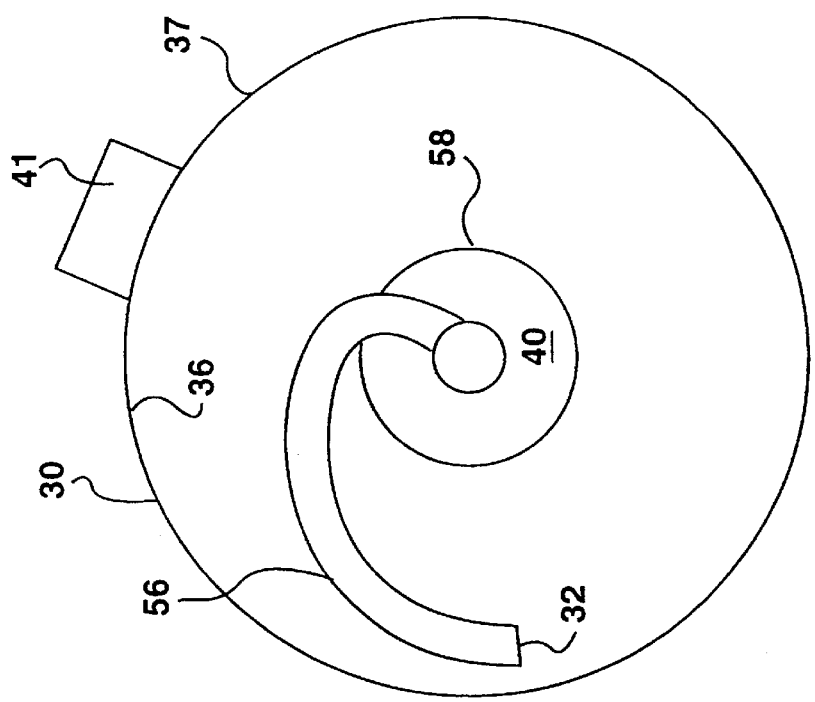
FIG. 5 is a cross-section along line 4—4 in FIG. 2 of an alternate preferred embodiment.

In one preferred embodiment, exit portion 56 includes a curved portion. More preferably, as shown in FIG. 5, exit portion 56 is curved so as it impart circular momentum to the dirty air as it travels therethrough. Depending upon the degree of curvature, exit portion 56 may assist in tangentially introducing the dirty air into container 30 or it may be the sole source of tangential entry into container 30 (eg. inlet 32 may merely be an opening in exit portion 56 which does not impart any tangential rotation to the dirty air). By constructing the supply conduit in this manner, a 90° elbow is not required to redirect the dirty air to enter container 30 tangentially. In a typical application, replacing a 90° elbow with a gradual curved path to redirect the dirty air results in a about a 5 to 10% reduction in the loss of suction as the air travels through the vacuum cleaner. Thus, a smaller motor may be incorporated into the vacuum cleaner to obtain the same pressure at inlet 32 or the suction at end 52 may be increased if the same motor is used.

Referring to FIG. 3, it will be appreciated that the dirty air travelling in downstream portion 50 must travel outwardly to inlet 32. In an alternate preferred embodiment, exit portion 56 curves gently from the upper end of downstream portion 50 so as to travel outwardly towards inlet 32. More preferably, the change in direction of the dirty air from vertical to horizontal and from horizontal to tangential occurs so as to reduce the pressure drop during its travel from downstream portion 50 to container 30.

Centrally located in upper end 34 of container 30 is a clean air outlet 40 for permitting withdrawal of air from container 30, as will be described below. From clean air outlet 40, the air flow may proceed, if desired, to a second stage of filtration, such as a second cyclone or other filtration means (not shown). Subsequently, it may be in air flow communication with vacuum fan motor 24 via an exit conduit 41. Head 22 has an exhaust port (not shown) for expelling clean air to the environment.

In operation, the vacuum fan motor 24 is activated to induce an air flow through cleaner 20. The air flow causes a partial vacuum to form at end 52. Air, and entrained dirt, is drawn into upstream portion 48, with the aid of brush member 26. The dirty air flow moves vertically in downstream portion 50 to dirty air inlet 32 via exit portion 56 and is introduced tangentially to container 30. The airflow is then accelerated around dirt rotation surface 36, and proceeds generally downwardly along and around dirt rotation surface 36 until it reaches a position towards bottom 38 of container 30, at which point the air flow travels upwardly through the central portion of cyclone container 30. Wall 58 may provide an opening in container 30. Wall 58 assists in preventing the treated air travelling upwardly to outlet 40 from mixing with the dirty air which is introduced into container 30 via inlet 32.

As can be seen by a comparison of intake conduits 16 and 46, of cleaner 10 and cleaner 20 respectively, the reduction of bends in the air conduit of the present invention beneficially results in a significant reduction in the turbulent pressure loss in the intake conduit, thereby markedly improving the efficiency of the cyclonic separation device as a whole.

The presence of downstream portion 50 extending through the centre of container 30 interferes minimally with the cyclonic action of the air flow within container 30. Thus the presence of downstream portion 50 does not significantly effect the efficiency of the cyclone.

Therefore, the configuration of the air intake conduit according to the present invention advantageously permits a substantial reduction in the pressure loss experienced in the intake conduit without interfering with the overall performance of the cyclone separation device. Thus, the present invention permits a deeper vacuum to be drawn at the intake end 52, for a given vacuum motor size. Conversely, motor size may be reduced in conjunction with the present invention without losing vacuum power over devices having air intake conduits according to the prior art, thereby permitting a comparable vacuum cleaner to be provided at lesser cost.

While the above description constitutes the preferred embodiments, it will be appreciated that the present invention is susceptible to modification and change without departing from the fair meaning of the proper scope of the accompanying claims.

We claim:

1. A vacuum cleaner comprising:
   (a) a housing;
   (b) a cyclone removable from the housing and having a bottom, a wall having an inner surface, a longitudinally extending axis and an outlet in communication with a source of suction;
   (c) a fluid inlet to the at least one cyclone; and,
   (d) a fluid supply conduit extending along the length of the cyclone from the bottom to the fluid inlet and forming a one-piece assembly therewith and communicating with a dirty air inlet and with fluid inlet, the fluid supply conduit removable with the cyclone from the housing.

2. The vacuum cleaner as claimed in claim 1 wherein the fluid supply conduit extends longitudinally through the cyclone.

3. The vacuum cleaner as claimed in claim 1 wherein the fluid supply conduit extends coaxially with the axis of the cyclone.

4. The vacuum cleaner as claimed in claim 1 wherein the cyclone has a central portion and the fluid supply conduit extends through the central portion.

5. The vacuum cleaner as claimed in claim 4 wherein the fluid supply conduit comprises an exit portion which extends within the cyclone from the central portion outwardly towards the inner surface.

6. The vacuum cleaner as claimed in claim 5 wherein the exit portion includes a curved portion.

7. The vacuum cleaner as claimed in claim 6 wherein the exit portion extends substantially horizontally.

8. The vacuum cleaner as claimed in claim 1 wherein the fluid supply conduit comprises an exit portion which is configured to direct fluid tangentially into the cyclone.

9. The vacuum cleaner as claimed in claim 1 wherein the fluid supply conduit comprises an exit portion which is curved to at least assist in directing fluid tangentially into the cyclone through the fluid inlet.

10. The vacuum cleaner as claimed in claim 1 wherein the fluid supply conduit comprises a longitudinally extending portion and an exit portion which extends within the cyclone from the longitudinally extending portion outwardly towards the inner surface, the longitudinally extending portion having a curved portion which merges with the exit portion.

11. The vacuum cleaner as claimed in claim 10 wherein the exit portion is curved to at least assist in directing the fluid tangentially into the cyclone through the fluid inlet.

12. The vacuum cleaner as claimed in claim 1 wherein the cyclone has an outlet having a portion which is removable with the cyclone and one of the portion of the outlet and the portion of the fluid supply conduit is nested within the other.

13. The vacuum cleaner as claimed in claim 1 wherein the the fluid supply conduit is integrally formed as part of the cyclone.

14. The vacuum cleaner as claimed in claim 1 wherein the fluid supply conduit comprises (1) an upstream portion in air flow communication with the source of dirty air which is positioned exterior to the cyclone and (2) a downstream portion which extends longitudinally through the cyclone and the downstream portion is in air flow communication with the upstream portion when the cyclone is mounted in the housing and the downstream portion is removable with the cyclone from the housing.

15. A vacuum cleaner comprising:
   (a) a cleaning head for cleaning a surface;
   (b) a cyclone having a wall having an inner surface, a longitudinally axis and an outlet in communication with a source of suction;
   (c) a fluid inlet to the cyclone; and
   (d) a fluid supply conduit communicating with the cleaning head and with the fluid inlet, the fluid supply conduit extending longitudinally through the cyclone.

16. The vacuum cleaner as claimed in claim 15 wherein the fluid supply conduit extends through a central portion of the cyclone.

17. The vacuum cleaner as claimed in claim 16 wherein the fluid supply conduit comprises an exit portion which extends within the cyclone from the central portion outwardly towards the inner surface.

18. The vacuum cleaner as claimed in claim 17 wherein at least one of the fluid inlet and the exit portion are configured to direct the fluid tangentially into the cyclone.

19. The vacuum cleaner as claimed in claim 17 wherein the exit portion includes a curved portion.

20. The vacuum cleaner as claimed in claim 19 wherein the exit portion extends substantially horizontally.

21. The vacuum cleaner as claimed in claim 16 wherein the fluid supply conduit comprises an exit portion which is curved to at least assist in directing the fluid tangentially into the cyclone through the fluid inlet.

22. The vacuum cleaner as claimed in claim 15 wherein the fluid supply conduit extends coaxially with the axis of the cyclone.

23. The vacuum cleaner as claimed in claim 15 wherein the fluid supply conduit comprises a longitudinally extending portion and an exit portion which extends through the cyclone from the longitudinally extending portion outwardly towards the inner surface, the longitudinally extending portion having a curved portion which merges with the exit portion.

24. The vacuum cleaner as claimed in claim 23 wherein the exit portion is curved to at least assist in directing the fluid tangentially into the cyclone through the fluid inlet.

* * * * *